Jan. 1, 1935.  G. M. CROSS  1,986,186
SHOCK ABSORBING APPARATUS
Filed May 27, 1932
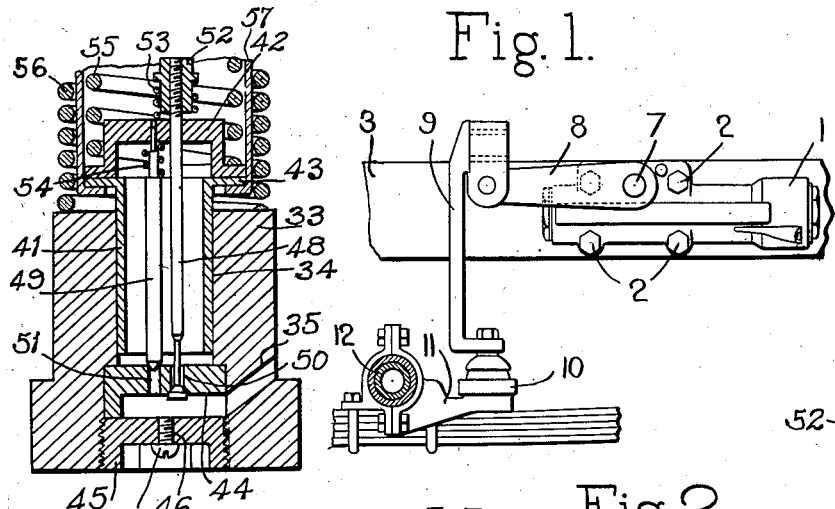
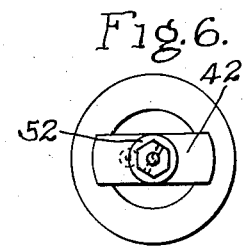
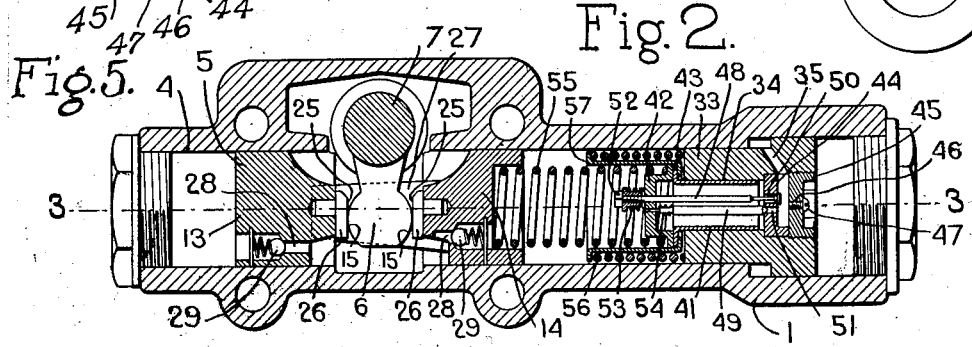
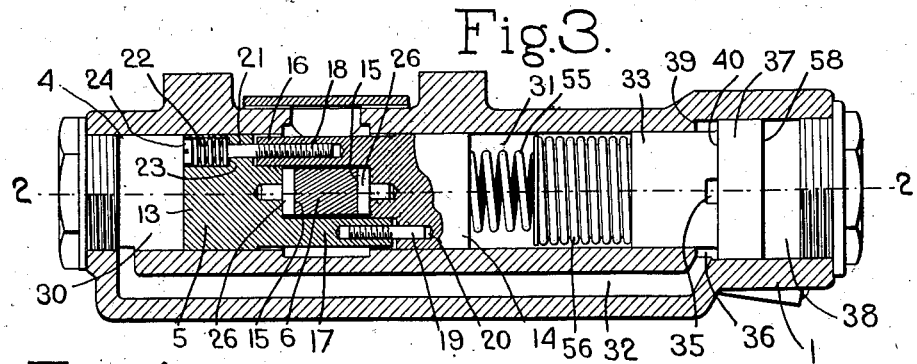
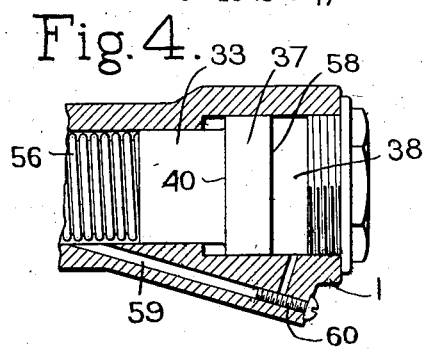
Inventor.
Grosvenor M. Cross
by Heard Smith & Tennant.
Attys.

Patented Jan. 1, 1935

1,986,186

UNITED STATES PATENT OFFICE 1,986,186

SHOCK-ABSORBING APPARATUS

Grosvenor M. Cross, Newton Center, Mass.

Application May 27, 1932, Serial No. 613,796

12 Claims. (Cl. 188—88)

This invention relates to apparatus for restricting or neutralizing the relative movement between two bodies and is designed particularly to neutralize certain of the movements between the bodies which are of undesirable character. In its broad aspect the invention relates to such an apparatus for modifying the relative movement between any two bodies. A particularly important application of the invention, however, is its use to control the relative movement between the body and the axle of a vehicle. In such capacity it permits the vehicle spring to absorb road shocks and thereafter to control the spring reactions resulting from such shocks, thereby to prevent transmission of destructive and uncomfortable motion to the vehicle body.

To be of maximum effectiveness such an apparatus should be capable of absorbing the rapid acceleration of the vehicle body due to the spring reaction following the initial flexing of the spring as the wheels of the vehicle ride over a projection in the road, and also the reaction following the drop of the vehicle wheels into a depression in the road. It is an important object of the invention to provide a shock-absorbing apparatus which will neutralize effectively all undesirable reactive forces of the vehicle spring and to control such forces in a manner to cause the vehicle body to return to its neutral position in a predetermined manner.

A further object of the invention is to provide a shock-absorbing apparatus which will act automatically to maintain its correct adjustment when the normal undisturbed position of the two relatively moving bodies is changed by reason of a change of load or other condition.

A further object of the invention is to provide a shock-absorbing apparatus having an automatic load-adjusting means which is actuated by a relatively great fluid pressure, and therefore is positive in its action.

Other objects and features of the invention will appear more fully from the following specification in connection with the accompanying drawing and will be pointed out particularly in the claims.

In the drawing:

Fig. 1 is a side elevation of a preferred embodiment of the device installed upon the frame of a vehicle and attached to the axle thereof.

Fig. 2 is a longitudinal cross sectional view on line 2—2 Fig. 3.

Fig. 3 is a cross section on line 3—3 Fig. 2 illustrating some of the parts in elevation.

Fig. 4 is a detail sectional view illustrating the by-pass which controls the position of the automatic load compensating device.

Fig. 5 is a longitudinal cross section view on a larger scale showing the adjusting head and valve mechanism.

Fig. 6 is a view looking toward the left of Fig. 1 showing the spider element in end elevation.

In order to exemplify clearly and accurately the principles of the invention, a particular embodiment thereof will be illustrated and described as applied to a vehicle. The casing 1 containing the active hydraulic controlling elements is provided with a plurality of hollow bosses in which are received bolts 2 which act to secure rigidly the casing 1 upon the frame 3 of a vehicle. The casing 1 has a cylindrical bore 4 therein in which is received a double acting piston 5 having a substantially central opening in which is received the outer end of an arm 6 rigidly secured to a shaft 7 rotatably mounted in the casing 1. One end of the shaft 7 projects through the wall of the casing and has secured thereto a lever 8 upon the outer end of which is pivoted a rigid link 9, upon the lower end of which is secured one member of a universal connection 10, the other member of which is secured to a bracket 11 rigidly fastened to the axle 12 of the vehicle. All relative motion between the axle 12 and the frame 3 therefore is transmitted directly to the piston 5. An upward movement of the axle when the wheels strike an obstruction in the road moves the piston to the left, while a downward movement of the axle moves the piston to the right. The piston 5 is of special construction being divided into two relatively movable sections through an irregular line at their inner ends. A portion of the outer periphery of each piston section is cut away to a point coinciding with the side faces of the arm 6. Lateral faces are then formed upon each section in position to engage the end faces 15 of the arm 6. The remaining side portions of the ends of each section form legs 16 and 17 which are provided respectively with guide pins 18 and 19. The pin 19 projects into and has a sliding fit within an aperture 20 formed in the piston section 14, while the pin 18 projects into an aperture 21 in the section 13. The aperture 21 is enlarged at its outer end to receive a compression spring 22 which is received upon the end of the pin 18 and bears at one end upon the shoulder 23, and at its other end upon the head 24 formed upon the pin 18. The spring 22 thus acts to draw the two piston sections together and in so doing causes the lateral faces 25 thereof to engage the faces 15 upon the arm 6. The faces 25 are formed preferably upon removable wear plates 26 which may be renewed in case of excessive wear. The spring 18 therefore acts automatically to prevent lost motion between the arm 6 and the piston.

The cylinder bore 4 is filled with oil or other suitable liquid, and a reserve supply is maintained in the central aperture 27 of the piston. If for any reason the oil within the bore 4 becomes depleted, means are provided to replenish the lost oil. Each section of the piston is provided with a port 28 leading from the central aperture 27 to the surface of the heads of the piston sections. Within each port 28 is received a check valve 29 which closes when a positive pressure is acting upon the heads of the piston. If during the operation of the device a negative pressure develops due to lack of oil within the bore, the valves will open and replenish the lost oil from the central aperture 27.

The initial movement of the piston in either direction from its neutral position caused by irregularities in the roadbed is unimpeded substantially, since by means of a system of valves the oil is permitted to flow freely from the chamber 31 at the right-hand end of the piston to the chamber 30 at the left-hand end of the piston, through a by-pass 32 when the motion of the piston is toward the right, and when the piston moves toward the left, the oil is permitted to flow through the by-pass 32 in the opposite direction. The return movement of the piston to a neutral position, however, is checked by means of the valve system in a manner to be set forth hereinafter.

The right-hand end of the chamber 31 is provided with a specially constructed head 33 which is movable within the bore 4, but is held in a substantially fixed position by a mean balance of oil pressures acting upon its opposite faces except when there is a change of load condition on the vehicle, at which time the head 33 acts to readjust the operation of the device to the new condition in a manner to be described.

The oil flowing from the by-pass 32 into the chamber 31 passes through a central cylindrical bore 34 in the head 33. The bore 34 communicates with a plurality of radially-disposed ports 35 which in turn communicate with an annular chamber 36. The head 33 has an enlarged end portion 37 which is received in a chamber 38 formed in the end of the casing 1. The annular chamber 36 therefore is formed between the shoulder 39 in the casing and the shoulder 40 of the enlarged end 37 of the head 33.

An efficient valve mechanism acts to check the return movement of the piston and comprises a sleeve 41 slidable within the aperture 34. The inner end of the sleeve 41 has abutting thereagainst a bridge or spider 42 resting upon an outwardly-turned flange 43 upon the sleeve 41. The outer end of the bore 34 has secured therein a valve seat plate 44 which is secured in position by means of a screw-threaded cap 45. To facilitate assembling the valve seat plate the cap 45 is provided with an aperture 46 which permits air or surplus oil to escape when the cap is screwed into position. The aperture 46 thereafter is closed by means of a screw plug 47.

Within the sleeve 41 is received a pair of valves 48 and 49. The valve 48 is arranged to close the port 50 against a flow of oil from the by-pass into the chamber 31 while the valve 49 is arranged to close the port 51 against flow in the opposite direction. The valves are supported at their ends opposite to the valve seat plate in the spider 42. The valve 48 projecting through the spider and having adjustably mounted upon its end a nut 52 which is provided with a shoulder against which a light spring 53 engages at one end, and at its other end the spring engages the spider 42 thus lightly urging the valve 48 upon its seat in the plate 44. The valve 49 is reduced at its inner end and is received slidably in the spider 42 and has upon its reduced portion a light spring 53 which engages at one end against the spider, and at its other end against the shoulder formed by the formation of the reduced portion. The valve 49 therefore is urged lightly against its seat in the plate 44 to prevent flow of oil from the chamber 31 to the by-pass 32.

The right-hand face of the piston 5 is recessed to receive the end of a heavy spring 55, the other end of which engages upon the spider 42 urging the spider and the sleeve 41 in a direction away from the piston. The tension of the spring 55 is resisted by the tension of another heavy spring 56 which acts at one end directly upon the head 33, and at its other end upon an outwardly-turned flange formed upon a spring-retaining member 57. The spring retainer 57 also has an inwardly-turned flange which engages the outer face of the outwardly-turned flange on the sleeve 41. The tension in the spring 56 therefore acts against the spring 55 and tends to move the sleeve 41 outwardly toward the piston 5. The sleeve 41 therefore assumes a position where the tension in the springs 55 and 56 becomes equalized as will appear hereinafter. When the piston 5 is in a neutral position, the head 33 will assume such position relatively to the valve mechanism that the valves 48 and 49 will be held upon their seats with a minimum of pressure determined by the springs 53 and 54.

In order to facilitate the description of the operation of the device, the head 33 will be considered as in fixed position. Its actual function will be described in detail hereinafter. When the vehicle meets an obstruction upon the road the upward motion of the axle 12 moves the piston toward the left. The oil in the chamber 30 therefore is forced through the by-pass 32 into the chamber 36 through the port 51 opening the valve 49 and flowing into the chamber 31. At the same time the motion of the piston toward the left relieves the tension in the spring 55 which automatically permits the tension in the spring 56 to exert a pressure through the retainer 57 tending to move the sleeve 41 toward the left. Such tendency causes the valve 48 to be seated firmly upon the valve seat plate 44 with a pressure determined by the extent to which the piston has been displaced. Upon the return movement of the piston to its neutral position the oil within the chamber 31 is prevented from flowing through the port 51 by the valve 49. The return flow of the oil must flow therefore through the port 50 and to do so the oil must open the valve 48 against the heavy pressure of the spring 56. The return movement of the piston 5 to a neutral position is checked, therefore, by a force proportional to the tension of the spring 56. This checking force, however, varies as the piston approaches its neutral point and becomes practically zero as the vehicle axle 12 and frame 3 assume their normal relation. The absorbing of the reaction of the vehicle spring thereby is accomplished in an ideal manner since the greatest retarding force acts at the maximum displacement of the spring and gradually tapers off to substantially nothing when the vehicle spring reaches its static or neutral position.

When the axle 12 of the vehicle suddenly moves downward as the vehicle wheel meets a depression in the road the piston 5 moves toward the right. Under these circumstances the oil within the chamber 31 flows through the port 50 opening the valve 48 against the light pressure of its spring 53, and thence flows through the radial ports 35 into the chamber 36 through the by-pass 32, and thence into the chamber 30 at the other end of the piston. Under these circumstances the tension in the spring 55 is greater and therefore over-balances the tension in the spring 56 and causes the sleeve 41 to move toward the right, such motion compressing small spring 54 and taking up the slight amount of axial play permitted between the spider 42 and the valve 49, and thereafter exerts the over-balancing force of the spring 55 directly upon the valve 49 closing it against its seat. Consequently the return movement of the piston to its neutral point is retarded because the flow of oil from the chamber 30 through the by-pass 32 is resisted by the before-mentioned over-balancing force of the spring 55. The retarding force also tapers from a maximum to substantially nothing in the manner described in connection with the motion of the piston in the opposite direction.

It becomes apparent from the foregoing description that if the relative position of the frame of the vehicle 3 and the axle 12 is changed by a change of load upon the vehicle body the position of the head 33 must move in order to establish a new neutral point of the piston, at which the retarding forces become substantially zero.

It has been found that deflections of the vehicle spring to each side of normal during the operation of the vehicle balance each other and that the product of the mean deflection above normal and the total time during which such deflections occur is equal to the product of the same quantities for deflections below normal. It is true also that deflections that occur in the reactive direction only, namely, the return stroke of the piston toward a neutral point likewise balance above normal as against below normal. Hence it follows that with the head 33 set in position to correspond to the normal relative position between the vehicle body and its axle the product of the mean of the pressures in one chamber and their duration will be equal to the product of the mean of the pressures in the other chamber and their duration.

It will now be apparent how the above discussed pressures act upon the load-adjusting head 33. The pressures acting within the chamber 31 act upon the inner end of the head with a force equal to the pressure in the chamber 31 times the area of the inner end of the head. The pressures in the chamber 31 are applied also to the outer end 58 of the head by means of a by-pass 59 communicating from the chamber 31 to the chamber 38. The area of the end 58, however, is greater than the area of the inner end of the head. This difference in area is equal to the area of the annular shoulder 40. The resulting force upon the head acts toward the left and is equal to the pressure in the chamber 31 times the area of the annular shoulder 40. The flow of oil, however, in the by-pass 59 is restricted by a screw 60 within the by-pass, the thread of which is sufficiently loose to permit of a restricted flow only. During one application of pressure in the chamber 31 the head 33 actually moves a very slight distance toward the left, but such movement is so slight due to the restriction in the by-pass as to be negligible in the functioning of the valves 48 and 49. The pressures within the chamber 30 act through the by-pass 32 upon the annular shoulder 40 of the head to move it toward the right. The force thus acting is equal to the pressure in the chamber 30 multiplied by the area of the annular shoulder. The resulting force upon the head, therefore, equals and is opposite to the force above described acting upon the head in the opposite direction. The slight movement of the head to the left therefore is counteracted by an equal movement to the right. Successive applications of pressure upon the head from both sides of the piston result therefore in maintaining the head in a substantially fixed position.

The discussion of the action of the head up to this point has been confined to a condition where the head has assumed its proper position to regulate the valve action properly for a given load upon the vehicle. Let it now be supposed that a decreased load is applied to the vehicle. The normal relative position of the body and axle thereby is changed and the neutral position of the piston shifts toward the right. Under these conditions the main pressure exerted by spring 55 is increased in proportion to the decrease of the vehicle load and is no longer balanced by the mean pressure of the spring 56. Hence the mean pressure upon valve 49 and the fluid pressure in chamber 30 is greater than that on valve 48 and chamber 31. Therefore the intermittent movements of the head 33 to the right are cumulatively greater than to the left until the head assumes a new neutral position to the right where the forces balance. When the balance is established the device again functions as above described for a normal condition with unchanging load. When the load is increased, automatic movement of the head takes place toward the left in a similar manner to establish again a normal condition.

In addition to the above-described retarding action, still another checking force is exerted between the body and axle. This additional checking force is due to the restriction of the fluid flow through the ports 50 and 51 in the head 33 since these ports are of a relatively small area. The amount of restriction which is required varies greatly with different vehicles and particularly with the weight of the unsprung elements thereof. It may be designed obviously to give any required value from substantially zero up to a very high value. Its purpose is to prevent excessive movement of the running gear under the vehicle such as might result if the initial deflection due to road irregularity were unrestricted entirely. The forces so exerted will always be small compared to the spring-controlled forces above-mentioned, and will depend in degree upon the velocity of movement of the axle, rather than upon its extent of movement. Thus a wheel striking a sharp obstacle in the roadway is prevented from being deflected further than necessitated by the obstacle itself, such over-deflection being the result of inertia due to its weight. On the other hand, if its rise over an obstacle is slow, this retarding force will be much less, hence contributing less shock to the vehicle body.

The arrangement of the springs 55 and 56 is such that a resulting force acts constantly against the head 33 tending to move it to the right. This tendency of the head to move is very slight compared to the large forces acting within the casing of the device during its operation. This force may result in a slight error in the position of the head 33 and after the device has remained idle over a period of time the head may shift to the right. This, however, is corrected automatically when the device again begins to function. In practice, however, this fault in the function of the device is so slight as to be negligible. If it is found desirable, this error could be largely eliminated by placing a spring against the right end of the head 1 to balance the average forces exerted on its left end.

While the invention is disclosed in its preferable form and as adapted for a vehicle shock absorbing apparatus, the invention is fundamentally embodied in an apparatus comprised of certain operating elements that may be similarly utilized in many other mechanical combinations to attain similar results. It will be noted that a primary reiterated reciprocating motion across a certain mean position (i. e., for example, the motion of the piston within the cylinder); that this fluid motion is so restricted by a valve system as to cause fluid back pressures to be exerted in the chambers; and that these fluid back pressures act to vary the position of a regulating mechanism which in turn reacts on the valve system in such a way that the specific back pressure causing such variation of position is thereby diminished. This acts to maintain automatically the resultant energy factor (i. e., mean pressure multiplied by the length of time such pressure acts) within one chamber substantially equal to the energy factor within the other chamber for any given mean position of the primary reciprocating motion.

Having thus described the invention, what is claimed as new, and desired to be secured by Letters Patent, is:

1. A shock-absorbing apparatus for vehicles comprising a liquid filled casing having a cylinder, a piston in the cylinder, means for connecting one of these elements to the body and the other to the axle to effect positive relative movement therebetween upon movement in either direction of the body and axle, a spring-controlled valve system within the casing acting to allow relatively free movement of the axle from its normal position relatively to the body toward or away from the body and to check its return movement toward normal position with a force determined by the extent of deviation of the axle from its normal position and automatic load-adjusting means actuated by the fluid pressure created by the motion of the piston.

2. A shock-absorbing apparatus for vehicles comprising a liquid filled casing having a cylinder therein, a piston in said cylinder, means for connecting one of these elements to the body and the other to the axle of the vehicle to effect positive relative movement therebetween upon movement in either direction of the body and axle, a head having hydraulically-resisted movement within the cylinder, valves in said head acting to permit relatively free movement of the axle from its normal position relatively to the body toward or away from the body, a pair of opposing springs normally in balance situated between the piston and the head, said springs acting when unbalanced by the piston to cause the valves to increase the pressure in the cylinder, such pressure acting to check the return of the vehicle body from above or below to its normal position, such pressure acting also upon said head whereby when the mean power factor of a succession of impulses in one direction is equal to the mean power factor of a succession of oppositely-acting impulses the head remains substantially fixed and when the oppositely-acting mean power factors do not balance the over-balancing mean power factor moves the head until the balance is established.

3. A shock-absorbing apparatus for vehicles comprising a liquid filled casing having a cylinder, a piston in said cylinder, means for connecting one of these elements to the body and the other to the axle of the vehicle to effect positive relative movement therebetween upon relative movement in either direction of the body and axle, a valve assembly within the casing including a pair of oppositely-opening valves, a pair of opposing springs and a spider interposed between the opposed ends of said springs and connected to said valves, the said springs acted upon by the piston and normally in balanced position and acting when unbalanced by movement of the piston in either direction to exert a force upon the valves determined by the extent of movement of the piston from its normal position, one of said valves acting to permit relatively free flow of the liquid between the ends of the cylinder upon movement of the axle either toward or from its normal position and closing upon return movement of the axle to normal position, the other of said valves being held to its seat during such movement and creating liquid pressure restraining force to check the return of the axle to normal position.

4. A shock-absorbing apparatus comprising a casing presenting the cylinder, a piston in the cylinder, means for connecting the one element to a vehicle body and the other to the axle to effect positive relative movement between said elements, a load-compensating head fitting and slidable in the chamber of the casing, liquid filling the casing, passageways connecting the ends of the cylinder respectively to the chamber at opposite sides of the head, a duplex valve assembly permitting fluid flow in either direction and preventing fluid flow in the opposite direction from one side of the piston to the other through the head, oppositely-acting counter-balancing springs between the piston and the head acting when at rest to position the valve assembly at neutral and acting when deflected by movement of the piston in either direction to shift the position of the valve assembly to control the flow of fluid through the head so as to check the return of the piston to its neutral position, and the said head sliding automatically in the chamber to establish a new neutral position for the valve assembly with each change in the weight of the vehicle body.

5. A shock-absorbing apparatus comprising the construction defined in claim 4 and means in the passageway extending to the chamber at the side remote from the piston for adjustably restricting the liquid flow therethrough.

6. In a shock absorber for vehicles, means connected to the body and axle of the vehicle and comprising hydraulic means operable by relative movements of the body and axle in one direction to produce a group of hydraulic pressures tending to prevent movement of the body and axle toward each other, and by the relative movements of the body and axle in the other direction to produce another group of hydraulic pressures tending to prevent movement of the body and axle away from each other, an adjusting element operable by the hydraulic pressures of said groups and having a resultant movement corresponding to the differences between the mean pressures of said groups, and a valve mechanism controlling said pressures and controlled by the movements of said adjusting element.

7. A hydraulic shock absorber having piston and cylinder elements connected each to one of the body and axle elements of a vehicle; an adjusting element contained by one of the piston and cylinder elements and having a movement therein actuated by hydraulic pressures in said cylinder; a valve mechanism controlling by fluid restriction said hydraulic pressures and connected to said adjusting element; and a spring connection between said valve mechanism and the other of said piston and cylinder elements.

8. A vehicle with body and axle elements; a shock absorber containing piston and cylinder elements connected to said body and axle elements, one to each; two fluid filled chambers the movement of fluid between which is determined by the relative movement of the piston and cylinder elements, said chambers having a passage therebetween; a valve mechanism interposed in said passage, a spring actuating connection between the valve mechanism and one of the piston and cylinder elements, flexing of which in one direction acts to cause valve movement in one direction and resultant fluid back pressure in one of said chambers and flexing of which in the other direction acts to cause valve movement in the other direction and a resultant fluid back pressure in the other of said chambers, a casing and an adjusting element having a limited movement therein, said adjusting element being connected to said valve mechanism and causing by its movement within the casing movements of the valve mechanism similar to those caused by flexing of said spring connection and hence similar changes of pressure in said chambers, a second pair of chambers in the casing at opposite sides of the adjusting element and in hydraulic connection each with one of said first chambers, whereby a differential of fluid pressure therebetween acts to cause movement of said adjusting element and affects said valve mechanism to diminish the fluid pressure in the direction of said movement; the hydraulic connection between one of said second chambers and said first chambers being restricted to permit a limited flow of fluid therethrough.

9. In a hydraulic shock absorber for vehicles, means translating relative movement between vehicle body and axle elements into fluid flow between two hydraulic chambers; a valve controlling by restriction of flow the fluid back pressures in said chambers; an adjusting element having an operative connection with said valve; hydraulic passages respectively connecting said chambers with opposite sides of said adjusting element whereby pressure in either chamber moves said adjusting element in such a direction that said pressure is diminished through the connection of said adjusting element with said valve; one of said hydraulic passages being restricted to limit the rate of flow of fluid therethrough.

10. A vehicle body and axle; a piston movable within a fluid filled cylinder, and causing by its motion within said cylinder a flow of fluid between two hydraulic chambers; the piston and the cylinder operatively connected the one to the axle and the other to the body; a valve system interposed in the path of the fluid flow between the chambers, and checking said fluid flow to cause back pressures to be developed in said chambers; an adjusting element connected to said valve system and having a relatively slow movement in response to said back pressures; said valve system and the pressures developed thereby being interactively controlled by the position of the piston within the cylinder and by the relative position to one of these of the adjusting element, the slow movement of the adjusting element being always in such a direction as, by its effect on the valve system, to diminish the back pressure causing that movement.

11. A fluid-operated apparatus comprising two fluid-filled chambers, a valve system, and a regulating mechanism in which a primary reiterated reciprocating motion across a certain mean position communicates similar fluid motion between the two chambers and in which this fluid motion is restricted by the valve system to cause fluid back pressures to be exerted in the chambers and in which these fluid back pressures act to vary the position of the regulating mechanism which in turn reacts on the valve system to cause the specific back pressure causing such variation to be thereby diminished and in which the product of the mean pressure and the length of time such pressure acts within one chamber is maintained automatically substantially equal to the product of the mean pressure and the length of time such pressure acts within the other chamber for any given mean position of the primary reciprocating motion.

12. A shock-absorbing apparatus for vehicles comprising a liquid filled casing having a cylinder, a piston in the cylinder, means for connecting one of these elements to the body and the other to the axle to effect positive relative movement therebetween upon movement in either direction of the body and axle, a spring-controlled valve system acting to allow relatively free movement of the axle from its normal position relatively to the body toward or away from the body and to check its return movement toward normal position with a force determined by the extent of deviation of the axle from its normal position and automatic load-adjusting means actuated by the fluid pressure created by the motion of the piston.

GROSVENOR M. CROSS.